(12) United States Patent
Niu

(10) Patent No.: US 7,434,295 B2
(45) Date of Patent: Oct. 14, 2008

(54) SPRING HINGE USING CLUTCH STRUCTURE FOR EYEGLASSES

(76) Inventor: Shouye Niu, Liuyue Jinquan Industrial Section, Her ggang Town, Longgang District, Shenzhen, Guangdong (CN)

( * ) Notice: Subject to any disclaimer, the term of this patent is extended or adjusted under 35 U.S.C. 154(b) by 261 days.

(21) Appl. No.: 11/277,128

(22) Filed: Mar. 21, 2006

(65) Prior Publication Data

US 2006/0213031 A1    Sep. 28, 2006

(30) Foreign Application Priority Data

Mar. 22, 2005    (CN)    .................... 2005 2 0055867 U

(51) Int. Cl.
E05D 11/10    (2006.01)

(52) U.S. Cl. .............................. 16/228; 16/277; 16/303; 16/325

(58) Field of Classification Search .................... 16/228, 16/303, 363, 221, 351, 284, 285, 296, 318, 16/341, 362, 340; 74/567, 573.12, 267, 10.29, 74/10.6
See application file for complete search history.

(56) References Cited

U.S. PATENT DOCUMENTS

| | | | | |
|---|---|---|---|---|
| 3,671,111 A | * | 6/1972 | Okner | ......................... 351/113 |
| 4,428,094 A | * | 1/1984 | Emain | .......................... 16/228 |
| 4,951,349 A | * | 8/1990 | Dietrich et al. | ................ 16/228 |
| 5,678,206 A | * | 10/1997 | Ishii | ......................... 455/575.8 |
| 5,739,891 A | * | 4/1998 | Wei | .............................. 351/113 |
| 5,764,337 A | * | 6/1998 | Petignat | ...................... 351/153 |
| 5,937,062 A | * | 8/1999 | Sun et al. | ................ 379/433.13 |
| 5,975,693 A | * | 11/1999 | Malfroy et al. | ............... 351/153 |
| 6,163,926 A | * | 12/2000 | Watanabe | ..................... 16/228 |
| 6,665,906 B2 | * | 12/2003 | Li | ................................ 16/330 |
| 6,814,438 B2 | * | 11/2004 | Desbiez-Piat | ............... 351/153 |
| 2003/0172494 A1 | * | 9/2003 | Oshima et al. | ................. 16/285 |

FOREIGN PATENT DOCUMENTS

| CN | 96194866 | 7/1998 |
|---|---|---|
| JP | 10-152039 | 11/1999 |

* cited by examiner

*Primary Examiner*—J. Allen Shriver
*Assistant Examiner*—Matthew J Sullivan
(74) *Attorney, Agent, or Firm*—Global IP Services; Tianhua Gu

(57) ABSTRACT

A spring hinge using clutch structure for eyeglasses of the invention includes a hinge bracket, a end-meshing element, a central-meshing element; a hinge cannula, a resilient element received in the hole of the central-meshing element; a fixing element; and a slide bush. The present invention uses the clutch structure to retain engagement by the pressure of a spring to achieve an easy and smooth operation during the motion of opening or closing the eyeglasses.

5 Claims, 5 Drawing Sheets

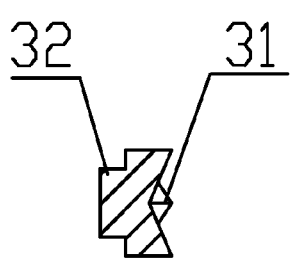
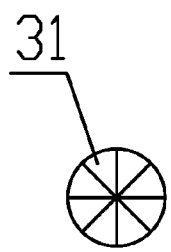
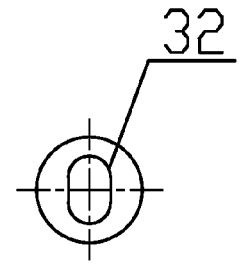
FIG. 7  FIG. 8  FIG. 9
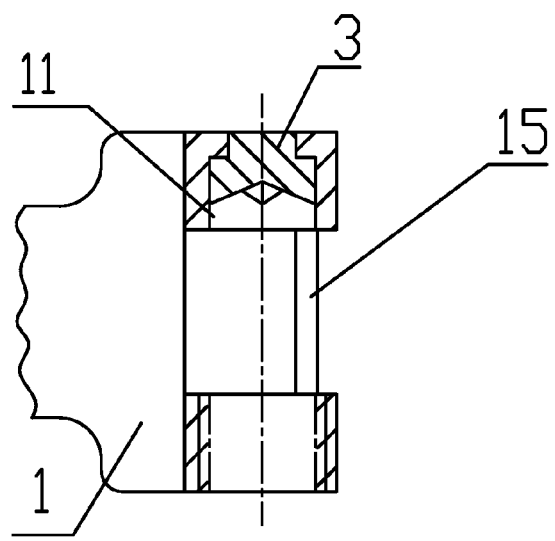
FIG. 10

SPRING HINGE USING CLUTCH STRUCTURE FOR EYEGLASSES

CROSS REFERENCE TO RELATED APPLICATION

This application claims the priority benefit of a Chinese patent application No. 200520055867.3 filed on Mar. 22, 2005.

BACKGROUND OF THE INVENTION

1. Field of the Invention

The present invention relates to eyeglasses, and particularly to a spring hinge using clutch structure for eyeglasses.

2. Description of the Related Art

As is known to all, spring hinge for eyeglasses has been used for many years. For example, a resilient hinge for spectacle frame is disclosed in Chinese patent No. 96194866.3. The resilient hinge can be directly connected to the lug or the side arm. It, with a rational structure, is durable and easy to control. The resilient hinge includes a male frame knuckle and a male side-arm knuckle rotatably interconnected by a pin. The contact surface of one of the knuckles has a diametrically extending projection with sloping sides for engaging a cross-shaped recess in the other knuckle. The recess defines the open and closed positions of the side arm. The disadvantages of such design are unsymmetrical, absonant and inaesthetic.

Also, a hinge equipment of the glasses frame is disclosed in Japanese patent application No. 10-152039. It relates to a hinge equipment of the glasses frame which helps the temples complete the motions of opening and closing by a cam mechanism. Each of the hinge knuckles of the ends of lens rim and the temples has a friction surface respectively. The friction surfaces which are rotatable with the hinge have a periodic function wave-like profile and are inconvenient to insert and remove. The portion of said frame engaging both of the temples and lens rim has a fixed element. The hinge knuckle of the fixed element, which retains a changeless relatively position of the hinge axis under an elastic force, has a same friction surface profile with the hinge knuckle of the end of the temples. The friction surfaces of said hinge knuckles occlude or converge in opposite directions under an elastic force to keep contacting and work cooperatively to complete the periodic intermittent hinge motion. The cam mechanism positions the temples when the temples rotate to open or close. The cam mechanism using the recess and the flange or the quadrate hole and quadrate axis to transmit force. Relative motion, concurring with the rotation motion, often needs a clearance fit which will result in a vacant position when the hinge rotates reversely. But avoiding the vacant position is very important especially for a hinge.

SUMMARY OF THE INVENTION

An object of the present invention is to provide a spring hinge using clutch structure for eyeglasses to solve the problems in the above prior art. Two meshing-teeth of the clutch structure retain engagement by the pressure of a spring to achieve an easy and smooth operation during the motion of opening or closing the eyeglasses.

The above object of present invention could be fulfilled by following measures.

The spring hinge using clutch structure for eyeglasses particularly comprises: a hinge bracket, a end of a linking section of the hinge bracket having an axial groove therein, another end of the hinge bracket connecting to a frame or temples, a upper wall and a lower wall of the groove having a upper through hole and a lower through hole therein respectively perpendicular to the two walls and a sidewall of the groove selectively being a hinge stop component; a end-meshing element having teeth on one end and being flat on another end, the end with teeth being fixed in one of the through holes of the hinge bracket; a central-meshing element received in a via hole of a hinge cannula, a inserting end of the hinge cannula having meshing-teeth and another end having a hole for receiving a resilient element, the central-meshing element selectively including a hinge stop component; a hinge cannula, which has a via hole therein, perpendicularly connecting to the temples or the frame, the outside of the hinge cannula having a stop component to work corporately with the hinge bracket; a resilient element received in the hole of the central-meshing element; a fixing element, which presses the bottom of the resilient element, screwing in a screw hole of the hinge bracket or a screw hole of the end-meshing element.

The object of present invention could also be fulfilled by following measures.

The end with teeth of said end-meshing element is fixed in the upper through hole of the hinge bracket.

The end with teeth of said end-meshing element is fixed in the lower through hole of the hinge bracket.

The hinge cannula and the central-meshing element are designed to be one component.

Said end-meshing element defines a screw hole.

Present invention could further includes a slide bush which is a columnar casing having a step through hole. A inside bigger hole is used to mount a spring and a smaller hole in the bottom is used to received a long screw. The outside columnar casing of the slide bush could freely slide in a bigger hole of the central-meshing element and the lower hole (or the upper hole) of the hinge bracket.

The following are the advantages of present invention compared with the prior art. 1. The structure of the hinge for eyeglasses is novel. 2. The figuration is unique and esthetical.

BRIEF DESCRIPTION OF THE DRAWINGS

FIG. 7 is a front view of the end-meshing element of the fourth embodiment of present invention;

FIG. 8 is a right view of the end-meshing element of the fourth embodiment of present invention;

FIG. 9 is a left view of the end-meshing element of the fourth embodiment of present invention;

FIG. 10 is a schematic view of the hinge bracket mounted with the end-meshing element of the fourth embodiment of present invention;

DETAILED DESCRIPTION OF THE INVENTION

Reference is now made to the drawings to describe the present invention in detail.

Figure 1:
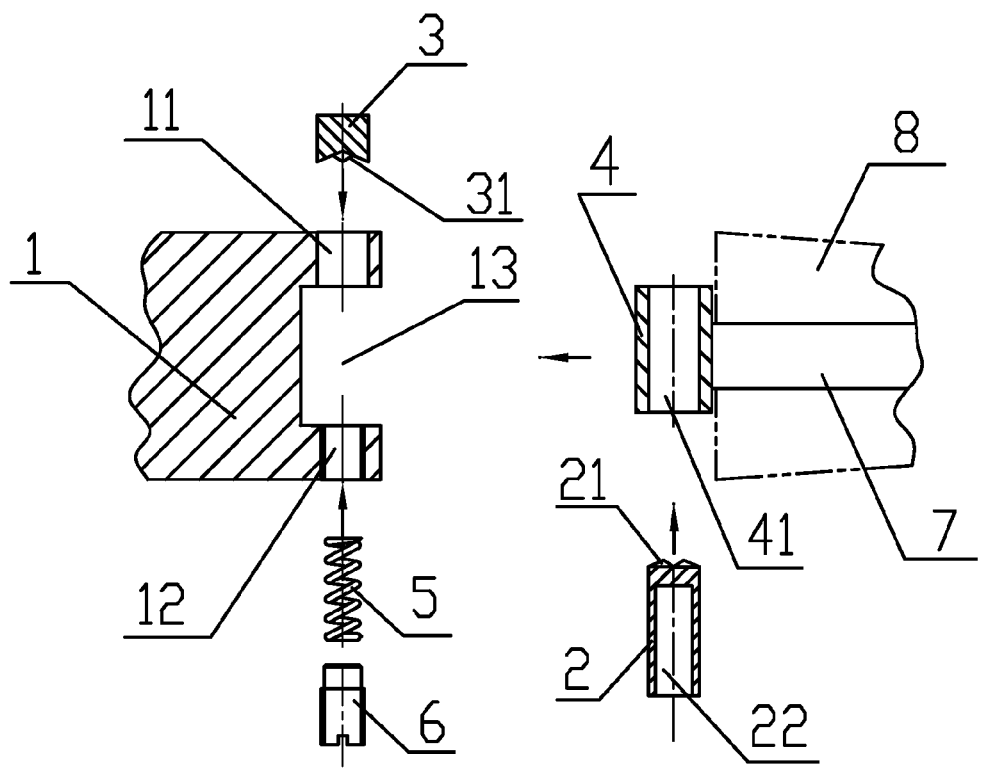
FIG. 1 is a structural exploded view of the first embodiment of present invention.
Figure 2:
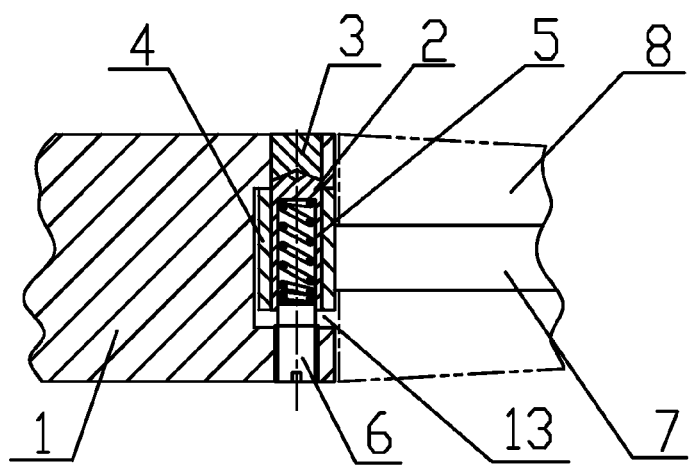
FIG. 2 is an assembly view of the first embodiment of present invention.
Figure 3:
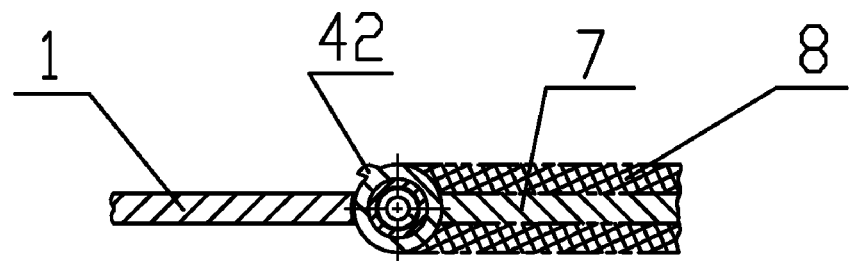
FIG. 3 is a planform view of FIG. 2.

FIG. 1~FIG. 3 show a first embodiment of present invention.

The spring hinge using clutch structure for eyeglasses comprises a hinge bracket 1, a end of a linking section of the hinge bracket 1 having an axial groove 13 therein. Another end of the hinge bracket 1 connects to a frame or temples. A upper wall and a lower wall of the groove have a upper through hole 11 and a lower through hole 12 therein respectively perpendicular to the two walls.

An end-meshing element 3 is received in the upper through hole 11 or the lower through hole 12 of the hinge bracket 1. An inserting end of the end-meshing element 3 has meshing-teeth 31 which could include 4 or 3 teeth. The end-meshing element 3 and one of the through holes of the hinge bracket are always fixed together by interference fit, weld or incrustation.

A central-meshing element 2 goes across a via hole 41 of a hinge cannula 4. An inserting end of the central-meshing element 2 forms meshing-teeth 21 and another end defines a blind hole 22 for receiving a spring 5.

The hinge cannula 4 perpendicularly connecting to the temples 7 has a via hole 41.

A spring 5 is received in the blind hole 22 of the central-meshing element 2. The spring 5 could be designed as a simple cylindrical screw pressure spring, including a flat spring.

A top portion of a screw 6 formed as a column is mounted in the blind hole 22 of the central-meshing element by clearance fit. And a lower portion with screw thread thereon is screwed in a screw hole of the hinge bracket 1. The columnar portion, which presses an exterior end of the spring 5, is received in the blind hole 22 of the central-meshing element 2.

In assembly, the hinge cannula 4 and the central-meshing element 2 which are engaged aforehand together with the temples 7 are inserted into groove 13 of the hinge bracket. Then the spring 5 and screw 6 which presses the bottom of the spring 5 are mounted in turn from the lower through hole 12 of the hinge bracket 1. Under the pressure of the spring 5, the meshing-teeth 31 of the end-meshing element 3 and the meshing-teeth 21 of the central-meshing element 2 keep contacting. The columnar portion of the screw 6 is inserted in the blind hole 22 of the central-meshing element 2. The clearance fit between the top columnar portion of the central-meshing element 2 and the through hole 11 of the hinge bracket together with the clearance fit between the columnar portion of the screw 6 and the blind hole 22 of the central-meshing element assures the straightaway slide and rotation of the central-meshing element 2 in the upper through hole 11, lower through hole 12 of the hinge bracket and well coaxial state of them.

A protruding portion 42 is defined on the outside surface of the hinge cannula 4 to work together with the hinge bracket to position the temples.

Figure 4:
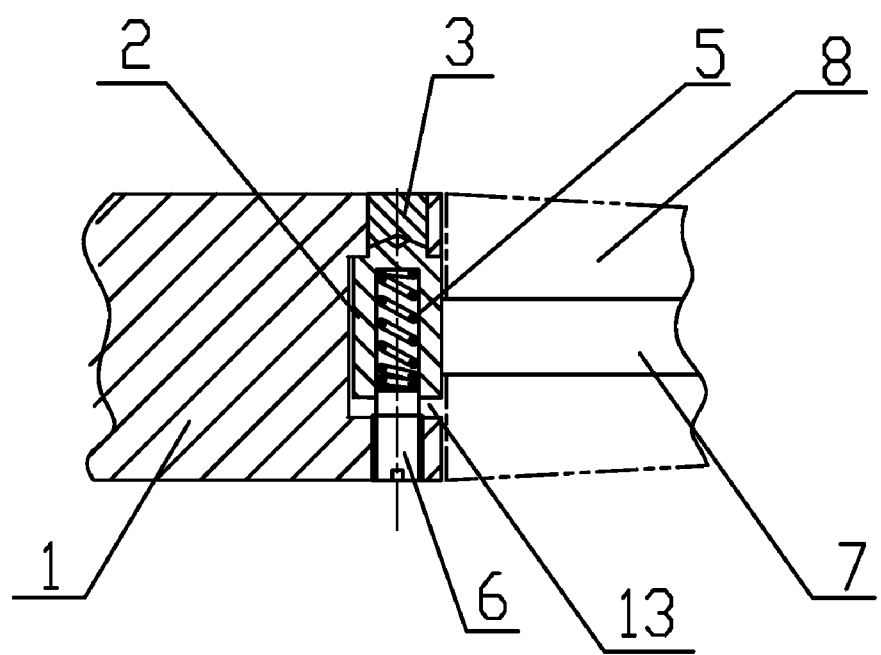
FIG. 4 is a structural schematic view of the second embodiment of present invention.

FIG. 4 shows the second embodiment of present invention.

The spring hinge using clutch structure for eyeglasses comprises a hinge bracket 1, an end of a linking section of the hinge bracket 1 having an axial groove 13 therein. Another end of the hinge bracket 1 connects to a frame or temples. A upper wall and a lower wall of the groove have a upper through hole 11 and a lower through hole 12 therein respectively perpendicular to the two walls.

An end-meshing element 3 is received in the upper through hole 11 or the lower through hole 12 of the hinge bracket 1. An inserting end of the end-meshing element 3 has meshing-teeth 31 which could include 4 or 3 teeth. The end-meshing element and one of the through holes of the hinge bracket are fixed together.

A top end of a central-meshing element 2 defines meshing-teeth thereon. The outside column of the central-meshing element 2 includes two sections. The thinner section is inserted into the through hole of the hinge bracket, and the thicker section is fixed together with the temples. The centre of the central-meshing element 2 defines a hole 22 to mount a spring 5 (The difference between this embodiment and the first embodiment is that the hinge cannula 4 and the central-meshing element 2 is formed as one component).

The spring 5 is received in the blind hole 22 of the central-meshing element 2. The spring 5 could be designed as a simple cylindrical screw pressure spring, including a flat spring.

A top portion of a screw 6 formed as a column is mounted in the blind hole 22 by clearance fit. And a lower portion of the screw 6 with screw thread thereon is screwed in a screw hole of the hinge bracket 1. The columnar portion, which presses an exterior end of the spring 5, is received in the blind hole 22 of the central-meshing element 2.

Figure 5:
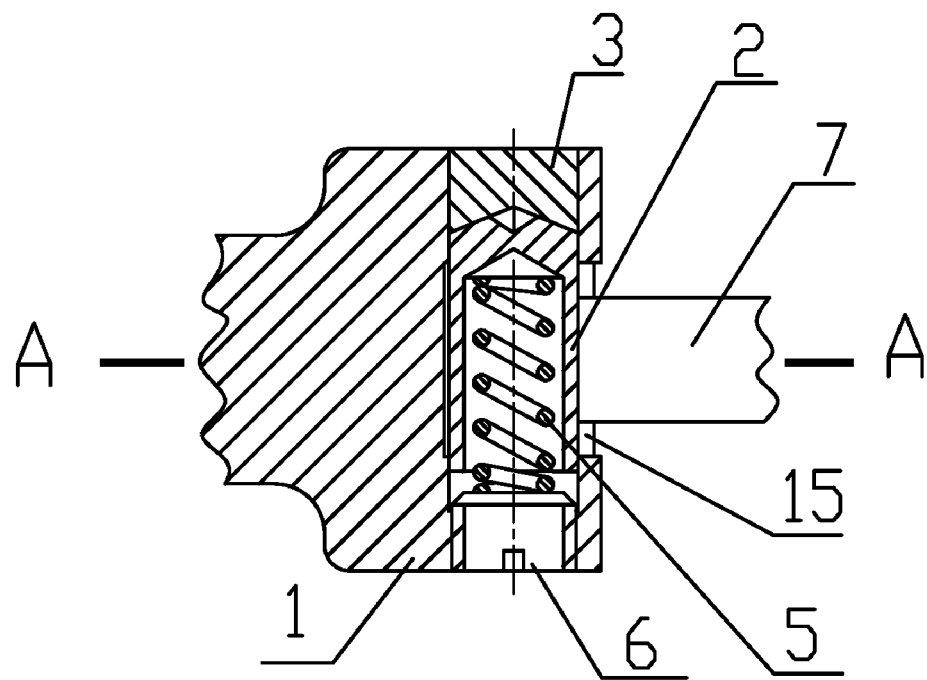
FIG. 5 is a structural schematic view of the third embodiment of present invention.
Figure 6:
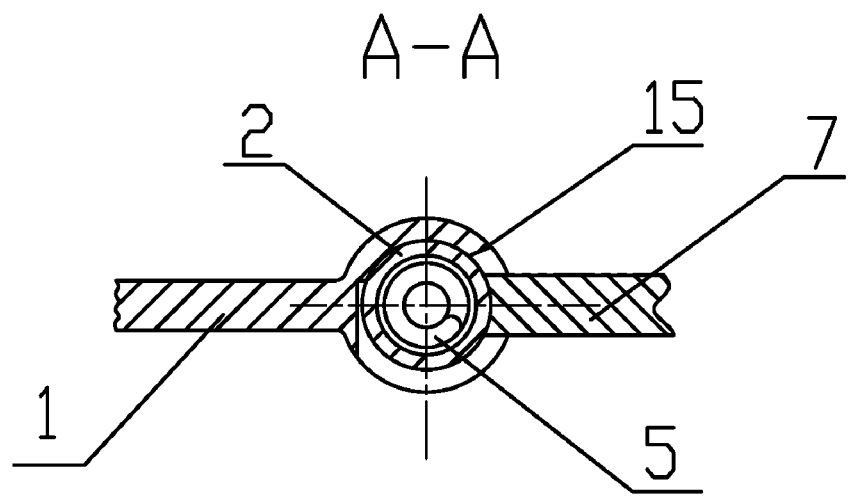
FIG. 6 is a planform view of FIG. 5.

FIG. 5~FIG. 6 show the third embodiment of present invention.

The spring hinge using clutch structure for eyeglasses comprises a hinge bracket 1, an end of a linking section of the hinge bracket 1 having an axial groove 13 therein. Another end of the hinge bracket 1 connects to a frame or temples. An upper wall and a lower wall of the groove have an upper through hole 11 and a lower through hole 12 therein respectively perpendicular to the two walls.

An end-meshing element 3 is received in the upper through hole 11 or the lower through hole 12 of the hinge bracket 1. An inserting end of the end-meshing element 3 has meshing-teeth 31 which could include 4 or 3 teeth. The end-meshing element and one of the through holes of the hinge bracket are fixed together.

A top end of a central-meshing element 2 defines meshing-teeth thereon. The outside column of the central-meshing element 2 includes two sections. The thinner section is inserted into the through hole of the hinge bracket, and the thicker section is fixed together with the temples. The top end of the central-meshing element 2 defines meshing-teeth thereon. One section of the outside column is inserted into one of the through holes of the hinge bracket, and one of its side could be fixed together with the temples. The centre of the central-meshing element defines a hole 22 to mount a spring 5.

A spring 5 is received in the blind hole 22 of the central-meshing element 2. The spring 5 could be designed as a simple cylindrical screw pressure spring, including a flat spring.

A screw 6, a top portion of which presses an exterior end of the spring 5, is screwed in a screw hole of the hinge bracket 1.

The outside of the groove 13 of hinge bracket 1 connects a thin edge 15 which works as a stop component. When the temples or copper core 7 are operated outward, it will stop rotating if contacting the thin edge 15. The central-meshing element 2 is always in the upper through hole 11, lower through hole 12 of the hinge bracket 1 when it moves up and down.

Figure 11:
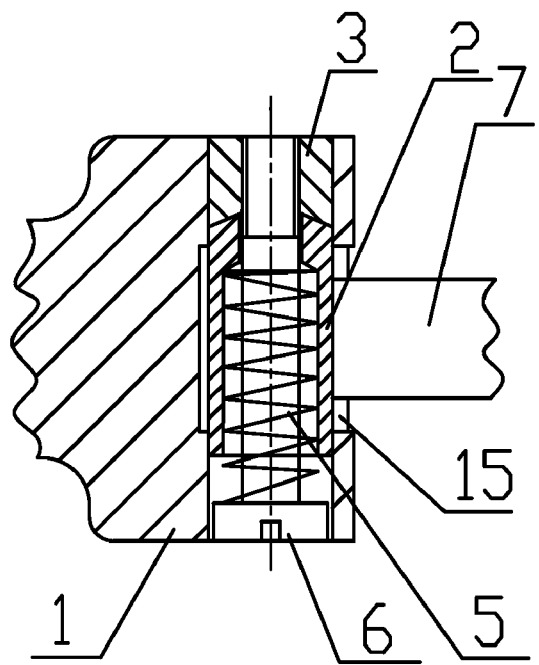
FIG. 11 is a structural schematic of the fifth embodiment of present invention.

FIG. 11 shows the fifth embodiment of present invention.

The spring hinge using clutch structure for eyeglasses comprises a hinge bracket 1, an end of a linking section of the hinge bracket 1 having an axial groove 13 therein. Another end of the hinge bracket 1 connects to a frame or temples. An upper wall and a lower wall of the groove have an upper through hole 11 and a lower through hole 12 therein respectively perpendicular to the two walls.

An end-meshing element 3 is received in the upper through hole 11 or the lower through hole 12 of the hinge bracket 1. An inserting end of the end-meshing element 3 has meshing-teeth 31 which could include 4 or 3 teeth. The end-meshing element and one of the through holes of the hinge bracket are fixed together.

The top end of the central-meshing element 2 defines meshing-teeth thereon. One section of the outside column is inserted into one of the through holes of the hinge bracket, and one of its side could be fixed together with the temples. The centre of the central-meshing element defines a hole 22 to mount a spring 5.

A spring 5 is received in the blind hole 22 of the central-meshing element 2. The spring 5 could be designed as a simple cylindrical screw pressure spring, including a flat spring.

A long screw 6 is screwed in a screw hole of the end-meshing element 3 and the inside surface of a columnar portion of the screw 6 presses an exterior end of the spring 5,.

The outside of the groove 13 of hinge bracket 1 connects a thin edge 15 which works as a stop component. When the temples or copper core 7 are operated outward, it will stop rotating if contacting the thin edge 15. The central-meshing element 2 is always in the upper through hole 11, lower through hole 12 of the hinge bracket 1 when it moves up and down.

Figure 12:
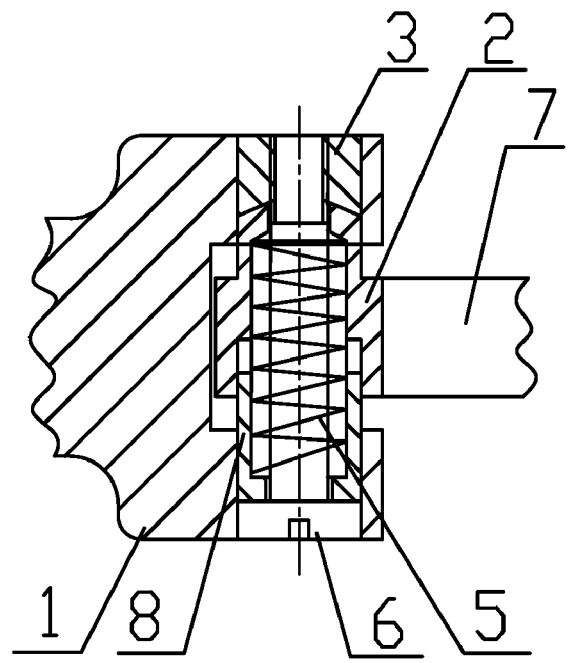
FIG. 12 is a structural schematic of the sixth embodiment of present invention.

FIG. 12~FIG. 13 show the sixth embodiment of present invention.

The spring hinge using clutch structure for eyeglasses comprises a hinge bracket 1, an end of a linking section of the hinge bracket 1 having an axial groove 13 therein. Another end of the hinge bracket 1 connects to a frame or temples. An upper wall and a lower wall of the groove have an upper through hole 11 and a lower through hole 12 therein respectively perpendicular to the two walls.

An end-meshing element 3 is received in the upper through hole 11 or the lower through hole 12 of the hinge bracket 1. An inserting end of the end-meshing element 3 has meshing-teeth 31 which could include 4 or 3 teeth. The end-meshing element and one of the through holes of the hinge bracket are fixed together.

A central-meshing element 2 defines a step column outside and a step hole inside. Its top end defines meshing-teeth thereon. The thinner section of the outside column is inserted into one of the through holes of the hinge bracket, and one side of the thicker section of the outside column is fixed together with the temples. The centre of the central-meshing element defines a hole 22 to mount a spring 5. The top end of the central-meshing element 2 defines meshing-teeth thereon. The outside column of the central-meshing element 2 includes two sections. The thinner section is inserted into one of the through holes of the hinge bracket, and the thicker section could be fixed together with the temples. With a step hole 22 defined in the centre of the central-meshing element, it's easy for a screw 6 to go through the central-meshing element 2, also easy to mount a spring 5 and a slide bush 8.

The spring 5 is received in the hole 22 of the central-meshing element 2 and a bigger hole of the slide bush 8. The spring 5 could be designed as a simple cylindrical screw pressure spring, including a flat spring.

The slide bush 8 forms as a straight column outside and defines a step hole inside. The outside column could be inserted into a bigger hole of the central-meshing element from one of the holes of the hinge bracket and slides freely in it. In assembly, the bigger hole of the slide bush faces to the hole of the hinge bracket and the bottom surface of the smaller hole of the slide bush faces to the outside of the hole of the slide bush.

The long screw 6, which goes across the slide bush 8, spring 5 and central-meshing element 2, is screwed in a screw hole of the end-meshing element 3. The inside surface of a columnar portion of the long screw 6 presses the bottom of the slide bush or the bottom of the spring.

In present invention, the total height of the central-meshing element 2 is less than that of the groove 13 of the hinge bracket 1. In assembly, the central-meshing element 2 and the temples 7 are fixed together aforehand and then both of them are inserted into groove 13. After the meshing-teeth 21 of the central-meshing element and the meshing-teeth 31 of the end-meshing element properly engage, the spring 5, slide bush 8 and the long screw 6 are mounted in turn. Advantages of present invention are its advanced techniques and convenience in the manufacture process.

The process of operation is as the following. The user holds the hinge bracket 1 and rotates the temples 7, and the central-meshing element 2 rotates around the axis. The meshing-teeth 21 of the central-meshing element 2 changes the relative position of the meshing-teeth 31 of the end-meshing element 3 while the hinge bracket 1 and the end-meshing element 3 keep their relative position. The central-meshing element 2 together with the hinge cannula 4 moves up and down under the elasticity of the spring 5. The temples 7 could rotate outward at an angle of 18~22 degrees with the hinge stop component and 180 degrees without the hinge stop component. The end-meshing element 3 and the meshing-teeth 21 of the central-meshing element 2 change the relative position of each other when the temples 7 rotates outward, and the force pressing the spring 5 reacts on the temples 7 to force the temples 7 to furl inby. When the temples 7 rotate inby at an angle of 90 degrees to fold, after a rise of the meshing-teeth moving from the bottom of the teeth to the top of the teeth, the meshing-teeth finally fall to the bottom of the teeth. Such motion process will bring a finger-popping feeling to the user.

Furthermore, although the present invention has been described with reference to above preferred embodiment, it is not to be construed as being limited thereto. Various alterations and modifications made to the embodiment without in any way departing from the scope or spirit of the present invention as defined in the appended claims are covered by the claims of the present invention.

What is claimed is:

1. A spring hinge using a clutch structure for eyeglasses comprising:

a hinge bracket, an end of a linking section of the hinge bracket comprising an axial groove therein, another end of the hinge bracket connecting to a frame or temples, an upper wall and a lower wall of the groove comprising an upper through hole and a lower through hole therein respectively perpendicular to the two walls and a sidewall of the groove being a hinge stop component;

an end-meshing element comprising an end with teeth thereon and another flat end, the end with teeth being fixed in the through hole of the hinge bracket;

a central-meshing element received in a through hole of a hinge cannula, an end of an inserting end of the central-meshing element comprising meshing-teeth and another end comprising a hole, the central-meshing element comprising a hinge stop component;

a hinge cannula, which has a through hole therein, perpendicularly connecting to the temples or frame, the outside of the hinge cannula comprising a stop component to work cooperatively with the hinge bracket;

a resilient element received in the hole of the central-meshing element;

a fixing element, which presses the bottom of the resilient element, screwing in a screw hole of the hinge bracket or a screw hole of the end-meshing element; and a slide bushing, which is a columnar casing has a stepped through hole inside, a bigger hole of the slide bushing being used to mount a spring and a smaller hole being used to received a long screw, the outside of the columnar casing sliding between the central-meshing element and the through hole of the hinge bracket, and the inside bottom of the smaller hole of the slide bushing pressing the bottom of the spring and the outside bottom pressing the inside surface of the long screw head.

2. The spring hinge using clutch structure for eyeglasses of claim 1, wherein the end with teeth of said end-meshing element is fixed in the upper through hole of the hinge bracket.

3. The spring hinge using clutch structure for eyeglasses of claim 1, wherein the end with teeth of said end-meshing element is fixed in the lower through hole of the hinge bracket.

4. The spring hinge using clutch structure for eyeglasses of claim 1, wherein the hinge cannula and the central-meshing element are integrally formed.

5. The spring hinge using clutch structure for eyeglasses of claim 1, wherein the flat end of said end-meshing element comprises a screw hole.

* * * * *